(12) United States Patent
Duffy

(10) Patent No.: US 8,136,331 B2
(45) Date of Patent: Mar. 20, 2012

(54) HEAT AND PRESSURE RESISTANT BOTTLE WITH INCREASED OXYGEN BARRIER AND METHOD OF PRODUCTION

(75) Inventor: James F. Duffy, Lafayette Hill, PA (US)

(73) Assignee: Protica, Inc., Whitehall Township, PA (US)

( * ) Notice: Subject to any disclaimer, the term of this patent is extended or adjusted under 35 U.S.C. 154(b) by 0 days.

(21) Appl. No.: 13/024,465

(22) Filed: Feb. 10, 2011

(65) Prior Publication Data

US 2011/0126493 A1    Jun. 2, 2011

Related U.S. Application Data

(63) Continuation of application No. 11/772,292, filed on Jul. 2, 2007, now abandoned, which is a continuation-in-part of application No. 10/711,580, filed on Sep. 26, 2004, now abandoned.

(51) Int. Cl.
*B65B 11/52*    (2006.01)

(52) U.S. Cl. ............... 53/442; 53/396; 53/427; 53/440; 53/441; 215/43; 215/44; 215/318; 264/532; 428/34.1

(58) Field of Classification Search ............... 53/396, 53/427, 440, 441, 442; 215/43, 44, 318; 264/532; 428/34.1
See application file for complete search history.

(56) References Cited

U.S. PATENT DOCUMENTS 3,900,120 A * 8/1975 Sincock .................. 428/542.8
6,698,160 B2 * 3/2004 Peronek et al. ................ 53/317

* cited by examiner

*Primary Examiner* — Brent O'Hern

(57) ABSTRACT

This invention provides a bottle that allows for easy and efficient application of shrink sleeves. The ease of application is partly a result of the invention's wall thickness along its body-forming portion. The body-forming portion of the invention has thick walls and thus exhibits negligible expansion during a hot-filling process. This permits a shrink sleeve to be placed onto the body-forming portion of the resistant bottle prior to filling. If the resistant bottle is hot-filled, the sleeve shrinks as a result of radiant heat emanating outwardly from the high temperature product, without the aid of an external heat source, such as a heat tunnel.

2 Claims, 3 Drawing Sheets

HEAT AND PRESSURE RESISTANT BOTTLE WITH INCREASED OXYGEN BARRIER AND METHOD OF PRODUCTION

CROSS REFERENCE TO RELATED APPLICATIONS

This application is a continuation of and claims priority to U.S. application Ser. No. 11/772,292, filed Jul. 02, 2007, now abandoned which is a continuation-in-part of U.S. patent application Ser. No. 10/711,580, entitled "Heat and Pressure-Resistant Bottle with Increased Oxygen Barrier" filed on Sep. 26, 2004 now abandoned. Each of these applications is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to plastic drinking containers. More specifically, the present invention relates to a plastic drinking container consisting of a hemispherical-shaped base-forming portion and a polygonal-shaped flange.

BACKGROUND OF THE INVENTION

A plastic bottle is typically designed with thin walls to reduce material cost. The disadvantages associated with a thin-walled plastic bottle are that it has a relatively low tolerance for internal and external oxygen permeation, pressure, and heat. The reduced oxygen barrier limits the shelf life of the product inside the bottle, and the low tolerance for pressure and heat limits the selection of processing methods that can be used to fill, cap and otherwise handle the bottle. Conversely, a plastic bottle with a relatively thicker wall provides a greater oxygen barrier and can withstand greater internal and external pressure, as well as external heat. This allows the bottle to exhibit an increased shelf life and be used in more processing methods, including high-temperature filling and vacuum filling.

Further, a bottle made of plastic is typically and substantially flat on the closed body-forming portion surface to allow the bottle to stand upright and move conveniently through processing lines. The disadvantage with a flat-bottom plastic bottle is that for soft drinks and other pressure applications, the best design for the bottom of a bottle is a hemispherical one.

Those in the industry will recognize that the aforementioned disadvantage to a typical bottle, namely thin walls and a flat bottom, are not found in a common bottle preform, the predecessor to a bottle. However, a bottle preform is not made for retail use. There are several features of a bottle perform that make it unsuitable and impractical as a consumer product, such as the downwardly directed axial projection in the form of an elongated gate at the closed end of many bottle performs, the superfluous material predominantly in the closed-end portion and in the lower half of the body-forming portion, the challenge with handling the preform during processing due to the hemispherical bottom, and the inconsistent inner diameter and outer diameter along the body-forming portion.

SUMMARY OF THE INVENTION

The purpose of this invention is to provide a bottle that exhibits some of the benefits of a bottle preform without the disadvantages, such that it can be pragmatically used as a retail consumer bottle. Specifically, the benefits of this resistant bottle are increased tolerance for internal and external pressure, heat and oxygen permeation, over that of traditional plastic bottles. The increased tolerance for internal and external pressure is a result of the invention's wall thickness and hemispherical-shaped bottom. The increased oxygen barrier and the increased heat tolerance are a result of the invention's wall thickness.

The benefits of increased resistance to internal and external pressure are that (A) the resistant bottle can be used with filling methods otherwise unsuitable for plastic bottles, such as vacuum filling; (B) the resistant bottle can be filled at pasteurization temperatures that exceed maximum temperatures for thin-walled bottles; and (C) the resistant bottle is more durable than traditional plastic bottles.

The benefit of increased oxygen barrier is an increased shelf life for food-grade and other degradable contents.

The purpose of this invention is to also provide a bottle that can be filled and capped at high speeds. As a circumstance of the hemispherical bottom, the resistant bottle must sit in a tray or puck during filling, capping and other processing activities. This could limit processing options because it is well established in the bottling industry that typical bottle-filling and bottle-capping machines need to process bottles that are standing freely upright and stable as they move along a processing line. This permits the machinery to grasp and hold the bottle in place during filling and capping. By means of a tray or puck in which the invention sits, the invention is standing, but it is not freely standing. By means of a tray or puck, the invention is also stable. To circumvent the need to stand freely, the resistant bottle is processed while in a tray. A polygonal-shaped stabilizing flange located near the opening of the invention eliminates the need for the resistant bottle to freely stand because it permits the resistant bottle to be held in place while seated in a tray.

The purpose of this invention is to also provide a bottle that allows for easy and efficient application of shrink sleeves. The ease of application is partly a result of the invention's wall thickness along its body-forming portion. It is well known in the bottling industry that a shrink sleeve is typically applied to a bottle after it has been filled and cooled when filling said bottle with a high temperature liquid product ("hot filling").

This invention is not dependent upon the specific type or design of the bottle finish. Any suitable finish may be used. Further, this invention is not dependent upon the process by which the resistant bottle is made.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

The purpose of this invention is to provide a bottle that exhibits some of the benefits of a bottle preform without the disadvantages, such that it can be pragmatically used as a retail consumer bottle. Specifically, the benefits of this resistant bottle are increased tolerance for internal and external pressure, heat and oxygen permeation, over that of traditional plastic bottles. The increased tolerance for internal and external pressure is a result of the invention's wall thickness and hemispherical-shaped bottom. The increased oxygen barrier and the increased heat tolerance are a result of the invention's wall thickness.

The benefits of increased resistance to internal and external pressure are that (i) the resistant bottle can be used with filling methods otherwise unsuitable for plastic bottles, such as vacuum filling; (ii) the resistant bottle can be filled at pasteurization temperatures that exceed maximum temperatures for thin-walled bottles; and (iii) the resistant bottle is more durable than traditional plastic bottles. The benefit of increased oxygen barrier is an increased shelf life for food-grade and other degradable contents.

Referring to the figures, it is possible to see the various major elements constituting the apparatus of the present invention. The present invention is a plastic container consisting of a hemispherical-shaped base-forming portion and a polygonal-shaped flange and method of production.

Figure 1:
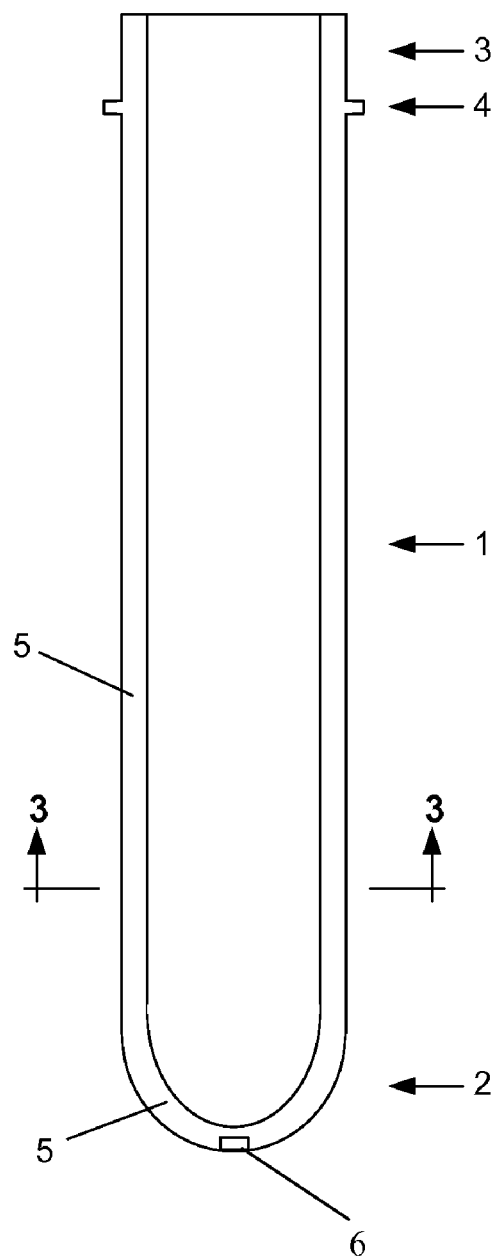
FIG. 1 is a vertical sectional view of the present invention particularly for containing fluids having a thick-walled perimeter, a hemispherical-shaped base-forming portion, and a recessed gate mark which is in lieu of the typical outwardly protruding nub typically found at the same location on bottle preforms.
Figure 2:
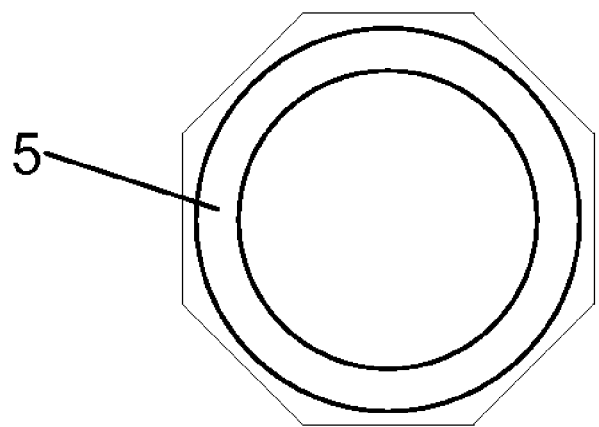
FIG. 2 is a horizontal top view of the present invention.
Figure 3:
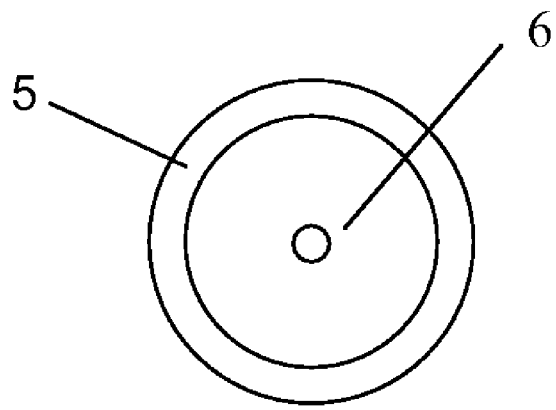
FIG. 3 is a horizontal sectional view of the present invention taken generally along the line 3-3 of FIG. 1 and shows the specific cross section of the body-forming portion.

Now referring to FIGS. 1 and 2, the body-forming portion 1 of the invention is cylindrical and hollow with a minimum wall thickness 5 of 1.5 mm and a maximum wall thickness of 4 mm. The base-forming portion 2 is hollow and closed at the hemispherical end with a minimum wall thickness 5 of 1.5 mm and a maximum wall thickness of 4 mm. The mouth-forming portion 3 is hollow and open with a minimum wall thickness 5 of 1.5 mm and a maximum wall thickness of 4 mm.

Extruding from the outer perimeter of the mouth-forming portion 3 and perpendicular to the cylindrical surface area of the body-forming portion is a polygonal-shaped flange 4 as shown in FIG. 1 and FIG. 2 exhibiting a minimum of six substantially straight sides. The number of sides is even. FIG. 2 shows a top view of the mouth-forming portion.

Applicant would like to emphasize the differences between the present application and "preforms" taught by the prior art and known to those of ordinary skill in the art. A preform is the predecessor to a bottle. A preform looks similar to the present invention, but a preform is neither suitable nor practical for use as a container until it is blown into a larger bottle. The present invention is for a bottle that is suitable and practical as a container and specifically not a preform for forming containers.

The purpose of the present invention is to create a container that is in a finished form suitable for use as a beverage or other container and suitable for consumer handling, not to create a preform that is suitable for later stretching and blowing into a bottle having a larger volume capacity and thinner walls. The present invention will not and cannot be used as a preform for stretching and blowing into a bottle exhibiting a larger volume capacity and thinner walls. Likewise, preforms are not fit for consumer use and consumer handling without modifications to (a) the nub at the closed-end portion and (b) the wall thickness.

To create a bottle from a preform, a sharp plastic nub is produced at the bottom of the closed-end portion of a preform, also known as the 'gate'. This is the result of the process used to create preforms. In contrast, the present invention has a small indention 6 at the location where the gate of a preform would have existed. After the blowing process the gate of a preform is reduced and often located in a concave bottom side of the blown bottle or in a recess so that the item is suitable for consumer handling.

Preforms are not suitable for consumer use or handling due to the protruding material at the gate location. As part of a preform, the protruding material, or 'nub', is irrelevant because a preform is not a finished good for consumer use, and the nub is flattened during the blow-molding process and is hidden in the concave side of the finished bottle.

Preforms are also not suitable as a finished product because of the excessive material predominantly located in the closed-end portion and the lower-half of the body-forming portion of the preform. If one were to use the preform as a consumer bottle, they would be at a great disadvantage in the market place from a manufacturing cost perspective. The additional material in wall thickness and within the gate required for a preform that is intended to be blow into a bottle greatly increases the cost of the raw materials necessary to produce the bottle taught by the present invention and leads to a large amount of waste. This increased manufacturing cost adds to the retail and market price of the bottle.

Additionally, if one were to use other preforms known in the industry where the gate is in the form of a sharp plastic nub, it would be a hazard to consumers as the sharp nub could cause physical damage by scratching other objects or getting caught on clothes in addition to potentially causing personal injury to humans by scratch or puncture. The only option one would have would be to grind off the sharp plastic numb that would also lead to an increased production cost, mess, and waste of raw materials.

Additionally, the inner and outer diameters of a preform are not constant because the finished bottle that is produced from the preform requires varying amounts of plastic along the height of the finished bottle. The wall thickness, particularly toward the bottom of the preform, must be greater than the thickness near the top of the body in order to allow for the extra material needed in the bottom of the finished container after it has been heated, stretched and blown.

When a preform is stretched and blown into its finished form (i.e. a bottle having a larger volume capacity and thinner walls), a greater abundance of plastic material is required at the bottom of the preform to achieve an essentially constant wall thickness in the finished product. Therefore, the wall thickness must be greater at the bottom of a preform, and thus there are inconsistent inner and outer diameters through the body-forming portion of a preform. While this inconsistent wall thickness is necessary for a preform, it is unnecessary and economically nonviable for the present invention because the present invention will not be blown and stretched into a larger capacity bottle. Specifically, the inner and outer diameters of the present invention's body-forming portion essentially constant because the present invention does not need to be stretched into a larger container. Depending upon the molding process for the present invention, the aforementioned diameters of the present invention may taper slightly, as is the case with some injection molding, in order for the finished part to eject properly from the mold. The angle of this taper is typically no more than one or two degrees, are not visually apparent and do not affect the functions described herein.

The present invention needs a relatively constant wall thickness so that the heat emanating from inside the vial during a hot-filling process is equally distributed along the entire length of the vial. This helps the shrink sleeve (i.e. label) to shrink evenly. A preform does not have a constant wall thickness because (i) it does not need even heat distribution since the preform is not a finished product, and (ii) it must have more plastic near the bottom half of the preform to ultimately be blown into a larger volume bottle.

A preform may require a wall thickness between 70 to 300 mils or approximately 1.78-7.64 mm, but the purpose is very different. The purpose of the wall thickness in a preform is to provide enough plastic material so that when the preform is blown and stretched into a larger bottle, there is enough material so that the finished container has a wall thickness that is a fraction of a millimeter. The purpose of the wall thickness of the present invention is to provide increased stress resistance, increased heat resistance, and an increased oxygen barrier. The present invention is able to achieve these benefits because the finished product maintains a wall thickness between 1.5 and 4 mm—it is not stretched until the wall thickness becomes so thin that we would lose the aforementioned benefits as occurs with a preform. The present invention requires a wall thickness of between 1.5 mm and 4 mm to achieve these benefits.

The purpose of this invention is to also provide a bottle that can be filled and capped at high speeds. As a circumstance of the hemispherical bottom, the resistant bottle must sit in a tray or puck during filling, capping and other processing activities. This could limit processing options because it is well established in the bottling industry that typical bottle-filling and bottle-capping machines need to process bottles that are standing freely upright and stable as they move along a processing line. This permits the machinery to grasp and hold the bottle in place during filling and capping. By means of a tray or puck in which the invention sits, the invention is standing, but it is not freely standing. By means of a tray or puck, the invention is also stable.

To circumvent the need to stand freely, the resistant bottle is processed while in a tray or puck. A polygonal-shaped stabilizing flange located near the opening of the invention eliminates the need for the resistant bottle to freely stand because it permits the resistant bottle to be held in place while seated in a tray. The flange has an even number of isometric, substantially straight outer surfaces; the minimum number of surfaces is six. A simple device or 'jig' whose perimeter is partially recessed to substantially matches more than half of the sides of the polygonal-shaped flange (specifically, one-half the number of surfaces plus one) can be placed against the flange of the resistant bottle to hold it in place and prevent rotation.

The jig can be fashioned with any number of flange-shaped openings to hold several resistant bottles in a single row so they may be filled simultaneously using a small, low-cost, multi-head filling machine. While fixed in the jig, the row of vials may also be capped simultaneously without chance of rotation using a row of low-cost, pneumatic cappers. The resistant bottles can then be placed directly into a shipping carton without ever being removed from the tray. This saves time in the production process by allowing the entire case of product to be filled into a corrugated container in one step.

While it is know to one of ordinary skill to use a polygonal-shaped flange perpendicular to the plane of the body-forming portion and where each isometric outside surface of the flange is substantially straight and used for holding and stabilizing said bottle during processing and that it would be obvious to one of ordinary skill in the art to suggests that one can use more or less walls it is not obvious to one of ordinary skill in the art that said walls can or can not be straight. Through testing, Applicant has learned that there is a significant advantage for creating a bottle that consists of a hemispherical bottle portion with a mouth portion that contains a polygonal-shaped flange specifically with six sides to inhibit or prevent rotation during capping. Such a feature on a preform offers no purpose in the process of pressuring a preform into a container as there are no issues or problems with inhibiting or preventing rotation during capping or even pressurization of a preform that would require or be solved by the use of such a flange.

The purpose of this invention is to also provide a bottle that allows for easy and efficient application of shrink sleeves. The ease of application is partly a result of the invention's wall thickness along its body-forming portion. It is well known in the bottling industry that a shrink sleeve is typically applied to a bottle after it has been filled and cooled when filling said bottle with a high temperature liquid product ("hot filling"). This is because the thin-walled body of a typical bottle expands as a result of the hot-filling process; the expansion will stretch or break the shrink sleeve. In contrast, the body-forming portion of the invention has thick walls and thus exhibits negligible expansion during a hot-filling process. This permits a shrink sleeve to be placed onto the body-forming portion of the resistant bottle prior to filling. If the resistant bottle is hot-filled, the sleeve shrinks as a result of radiant heat emanating outwardly from the high temperature product, without the aid of an external heat source, such as a heat tunnel.

The ease of shrink sleeve application is also partly a result of the invention's constant wall thickness along the resistant bottle's body-forming portion. The shrink sleeve is typically applied to only the body-forming portion of the resistant container, which extends from the bottom of the open-ended mouth-forming portion to the top of the hemispherical-shaped base-forming portion. The essentially constant outer diameter of the resistant bottle allows the shrink sleeve to be sized so that its inner diameter is only slightly large than the outer diameter of the resistant bottle's body-forming portion. When applied to the resistant bottle, the sleeve requires less heat for shrinkage than what is traditionally required by bottles with inconsistent outer diameters. The relatively constant wall thickness of the invention allows for even heat distribution across the entire surface area of the shrink sleeve.

At 170 degrees Fahrenheit, the liquid product induces complete sleeve shrinkage for most bottle plastics. This avoids the need for an additional heat source such as a heat tunnel and saves a step in the overall production process.

This invention is not dependent upon the specific type or design of the bottle finish. Any suitable finish may be used. Further, this invention is not dependent upon the process by which the resistant bottle is made.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for applying a shrink sleeve to a bottle without an external heat source comprising:
   placing a shrink sleeve onto the body forming portion of a bottle prior to filling;
   hot filling the bottle with a liquid;
   shrinking the sleeve as a result of heat emanating outwardly from the liquid; and
   capping the bottle;
   wherein the bottle comprises:
      an open-ended mouth forming portion;
      a body forming portion extending from the open-ended mouth-forming portion;
      a base portion; and
      the body-forming portion has substantially constant outer and constant inner diameters such that heat emanating from inside the vial during filling is equally distributed along the entire length of the bottle;
      wherein the body-forming portion has a minimum wall thickness of 1.5 mm to a maximum wall thickness of 4 mm.

2. The method as claimed in claim 1, wherein the bottle has a polygonal-shaped flange perpendicular to the plane of the body-forming portion and wherein each isometric outside surface of the flange is substantially straight and used for holding and stabilizing the bottle during processing.

* * * * *